United States Patent [19]

Bauer

[11] 4,291,860
[45] Sep. 29, 1981

[54] SOLENOID VALVES, PARTICULARLY FOR CARBURETORS

[75] Inventor: Philippe Bauer, Marly le Roy, France

[73] Assignee: Societe Industrielle de Brevets et d'Etudes, Paris, France

[21] Appl. No.: 46,266

[22] Filed: Jun. 7, 1979

[30] Foreign Application Priority Data

Jun. 28, 1978 [FR] France ............................... 78 19339
Oct. 12, 1978 [FR] France ............................... 78 29156

[51] Int. Cl.³ .......................................... F16K 31/06
[52] U.S. Cl. ............................... 251/129; 138/43; 261/DIG. 74; 251/141; 251/205
[58] Field of Search ............... 251/141, 129, 285, 205, 251/284, 210; 138/40, 44, 43; 261/DIG. 74

[56] References Cited
U.S. PATENT DOCUMENTS 3,431,028 3/1969 Yoder .......................... 137/513.5 X
3,521,853 7/1970 Gillis, Jr. et al. ............... 251/210 X
3,795,383 3/1974 Lombard et al. ............... 251/141 X
4,027,850 6/1977 Allen ................................. 251/141
4,136,645 1/1979 Ito et al. ..................... 261/DIG. 74
4,178,332 12/1979 Hogeman et al. ............. 251/285 X

FOREIGN PATENT DOCUMENTS 1259417 3/1961 France .

*Primary Examiner*—Arnold Rosenthal
*Attorney, Agent, or Firm*—John T. Synnestvedt; Richard D. Weber

[57] ABSTRACT

The solenoid valve of the invention comprises a housing having a fluid flow opening passage therethrough. A movable assembly is subjected to the opposing actions of a return spring and an electromagnetic coil. The movable assembly comprises an armature whose abutment against a guide defines an end position and a needle fixed to the armature, which defines with the opening a passage of minimum non zero cross-sectional area when the assembly is in the end position.

9 Claims, 3 Drawing Figures

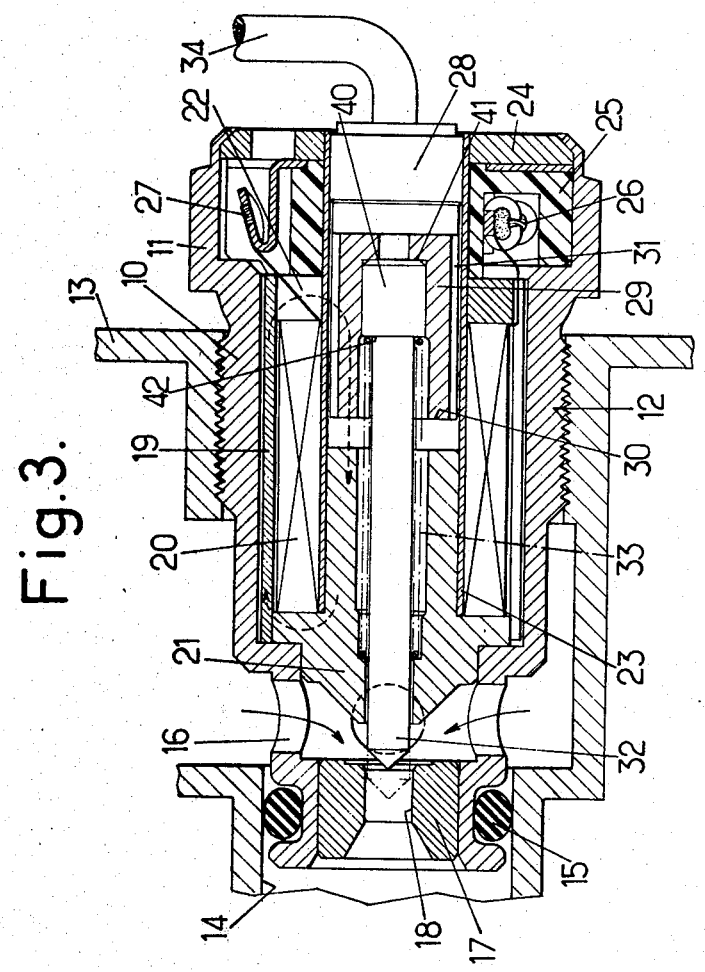

SOLENOID VALVES, PARTICULARLY FOR CARBURETORS

BACKGROUND AND SUMMARY OF THE INVENTION

The present invention concerns solenoid valves, also called electromagnetically controlled valves, comprising a housing defining a chamber provided with a fluid flow passage opening and in which a movable assembly is subjected to the action of a return spring biasing it towards a first end position and to the action of an electromagnetic coil whose action brings it to a second end position, against the action of the spring, when it is energized.

Solenoid valves of this type are known in the art. In most cases, one of the end positions is defined by abutment of a closure component of the movable assembly against a seat surrounding the opening.

Such solenoid valves are satisfactory as long as the passage opening has an appreciable cross-sectional area and as long as the components of the valve are sufficiently sized to avoid rapid wear in use.

On the other hand, for a number of uses, the cross-sectional area to be controlled is quite small and the overall size of the valve must be as small as possible. As an example, valves for metering a flow of liquid fuel in a fuel feed system for an internal combustion engine, in response to an operating parameter of the engine, typically the composition of the exhaust gases, should be of minimum size. It has already been suggested to meter the fuel with a solenoid valve which is not of the type providing a progressively variable opening, but is supplied with periodical electric pulses whose aperture ratio depends on the value of the operating parameter. The need to operate at a high frequency requires the movable assembly to have low inertia. If a fuel passage section is controlled directly, the flow cross sectional area when the valve is open must be very small.

Under these circumstances, there is fast wear and tear of the components of the valve, particularly the closure member and the seat.

Attempts have been made to overcome the difficulty by controlling the depression which draws fuel from a constant level chamber rather than the fuel passage cross section: the solenoid valve is then placed in an air circuit and may be larger in size. This solution is however only a palliative.

It is an object of the invention to provide an improved solenoid valve; it is a more specific object to provide a solenoid valve whose bulk and fluid passage section may be very small, having however a long operating life.

The invention makes use of the finding that, very often, it is not necessary for the solenoid valve to close the passage: in the example given above of a fuel supply system, fuel flow delivered to the engine is always greater than a predetermined minimum value, when the engine is operating.

According to an aspect of the invention, there is provided an solenoid valve having a movable assembly which comprises a armature whose abutment against guide means determines a second end position and a flow-control member fast with the armature, which defines with the opening a flow passage of maximum cross-sectional area when the assembly is in its first end position and a flow passage of minimum cross-sectional area different from zero when the assembly is in its second end position.

Such a valve, which may be termed "all or little" (in opposition to the "all or nothing" valves), may have a very extended life, for there is no substantial wear of the closure member. The abutment in the direction corresponding to the smallest flow cross section may be between parts of large size and may be through plane surfaces.

The closure member may be securely fixed to the armature, but it is then necessary to machine the armature and the closure member accurately, which results in a high cost. Moreover, heating of the armature during operation of the solenoid valve, particularly when the latter is controlled with rectangular pulses at high frequency, causes thermal expansions which may result in separation of the armature from the closure member. In an advantageous embodiment, the closure member is retained with the armature by a spring which holds it against a stop surface provided for this purpose on the armature.

The invention will be better understood from the description which follows of solenoid valves which form particular embodiments thereof. The description refers to the accompanying drawings.

SHORT DESCRIPTION OF THE DRAWINGS

Figure 1:
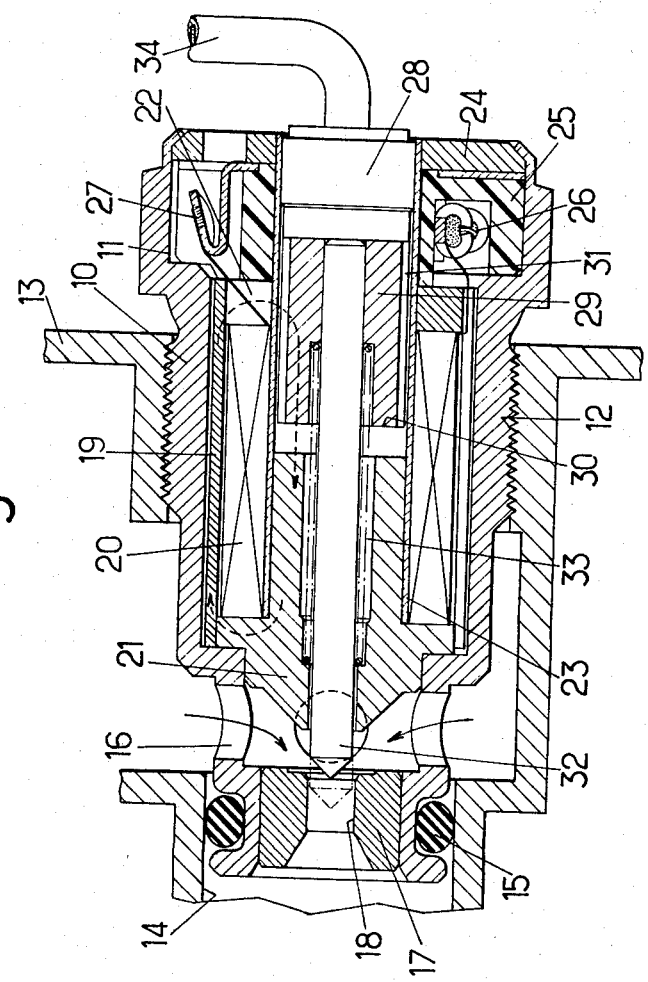
FIG. 1 is a longitudinal cross-section of a first embodiment of the solenoid valve in rest condition.

FIG. 3, similar to FIG. 1, shows another embodiment.

DETAILED DESCRIPTION OF PREFERRED EMBODIMENTS

Figure 2:
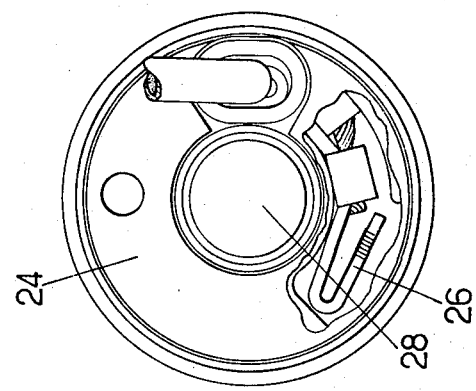
FIG. 2 is a right hand view of FIG. 1, part of the bottom of the valve being cut away.

Referring to FIGS. 1 and 2, there is shown a solenoid valve for use in the fuel delivery circuit of a carburetor. The valve comprises a housing 10 locating a movable assembly. Housing 10 comprises a body 11 provided with an external thread 12 for fixing the case in a wall 13. The housing may in particular be mounted in the threaded bore frequently provided in the wall of a carburetor float chamber, opposite a fuel outlet channel 14, generally provided with a calibrated restriction (not shown). In conventional carburetors, that bore is for temporary connection of a measuring apparatus during the final factory adjustment of the carburetor. The front end portion of body 11 has then a reduced diameter as compared with the rest of the solenoid valve so as to be insertable in channel 14 and is formed with a circular groove for receiving an O-ring 15. The portion of the body situated between the O-ring and the thread is provided with radial inlet apertures 16 for entry of fuel from the float chamber.

Housing 10 also is provided with a seat member 17 having an axial calibrated opening 18, forcibly engaged into the front end portion of body 11 or securely connected by any other appropriate means. Body 11 and seat member 17 are made from non-magnetic material, for example bronze or brass.

The stationary components of the electromagnetic circuit of the valve comprise an external tube 19, longitudinally split so as to be resilient, to exert a tightening force and to reduce the radial clearances. Tube 19 is tightly applied on a flange of a front guide 21 and on a ring 22. External tube 19, front guide 21 and ring 22 are made from magnetic material, for example soft iron.

The electrical control coil 20 of the solenoid valve is located inside tube 19, between the collar of guide 21 and ring 22. An internal guide tube 23 of non-magnetic material radially separates coil 20 from guide 21. Guide tube 23 projects rearwardly beyond ring 22. It defines, with body 11, ring 22 and a bottom wall 24 set in the body, an annular chamber which receives an insulating ring 25 in which are fixed two electrical connection lugs 26 and 27. The internal guide tube 23 is closed at the rear by a stop member 28 whose object will be described later.

The movable assembly of the valve comprises a soft iron armature 29 slidably mounted in the internal guide tube 23 for movement between a first end or rear position, in which it abuts stop member 28, and a second end or front position, in which its front flat surface 30 abuts a corresponding surface of front guide 21. The movable armature 29 is formed with lateral cut out portions 31 to provide an air passage and avoid damping of the reciprocating movements of the armature which would be caused by air compression.

The movable assembly further comprises a needle 32 of non-magnetic material (for example bronze) which is slidably received in the front guide 21. A return spring 33 biases armature 29 towards its first end position. When in that position, needle 32 defines a passage of maximum cross-sectional area with opening 18. When the armature is moved to its second end position responsive to energization of coil 20, needle 32 defines a passage of minimum non zero cross-sectional area in opening 18.

To prevent armature 29 from sticking magnetically to front guide 21, it may be subjected to a surface treatment, for example coated with films of copper, then of nickel. An additional advantage of such a coating is to improve surface condition of the armature and to decrease the frictional forces on the internal guide tube 23. To increase the rigidity of the assembly of stationary parts, coil 20 is advantageously impregnated with resin under vacuum.

The method of assembly of the valve may be conventional and need not be described. It may however be noted that the extent of travel of armature 29 may be adjusted by progressively force-inserting pin 28 into tube 23. A measuring tool may be inserted during this operation through seat member 17 to determine the position of the needle.

In the modified embodiment shown in FIG. 3 (where the parts corresponding to those already shown bear the same reference number), needle 32 is not secured to armature 29, but retained by a spring in abutment against a bearing surface provided on armature 29. The needle is formed with an enlarged rear end portion 40 whose diameter is such that it slidably engages a blind bore of armature 29. The bearing surface of the armature is formed on the bottom wall 41 thereof, in which there is provided an air passage.

The return spring 33 is compressed between guide 21 and a shoulder 42 which limits the enlarged portion 40. That arrangement, which implies that the compressive force of the return spring is sufficient for the needle to be maintained permanently against bottom wall 41, has the advantage of simplicity.

Tests have shown that it provides a fuel flow control as satisfactory as with a movable assembly comprising a needle securely fixed to the armature and that there is no separation.

The solenoid valve which has been described has numerous fields of use. In a carburetor, it may be used for controlling the fuel flow from the float chamber towards a main, idling or by-pass fuel delivery circuit. The output lead 34 of the coil is then connected to control electronics, whose input is for example the signal from an oxygen probe placed in the exhaust of the engine fitted with the carburetor.

It will moreover be apparent that a conventional carburetor may easily be modified by simply adding a solenoid valve as described and its control circuit; use is then made of the threaded bore, which normally receives a closure screw, for placing the solenoid valve.

I claim:

1. In a solenoid valve comprising:
housing means having a fluid flow opening,
a movable assembly having a first end position and a second end position,
a return spring operatively associated with said movable assembly for biasing it toward said first end position,
an electromagnetic coil carried by said housing and operatively associated with said movable assembly for bringing said movable assembly to said second end position when energized,
said movable assembly comprising an armature and a needle, abutment of said armature with the housing means determining one of said end positions in which said needle defines with said opening a passage of minimum non zero cross sectional area,
the improvement wherein said armature includes a radial bearing surface, and means for continuously biasing said needle into engagement with said bearing surface to prevent relative axial movement of said armature and needle.

2. A solenoid valve comprising:
housing means having a fluid flow opening,
a movable assembly having a first end position and a second end position,
a return spring operatively associated with said movable assembly for biasing it toward said first end position,
an electromagnetic coil carried by said housing and operatively associated with said movable assembly for bringing said movable assembly to said second end position when energized,
said movable assembly comprising a needle slidably received in a guide of said housing means and an armature whose abutment against said guide determines said second end position, a radial bearing surface on said armature, and means for biasing said needle into continuous engagement with said bearing surface, said needle defining with said the opening a passage of maximum cross-sectional area when the movable assembly is in said first end position and a passage of minimum non zero cross-sectional area when the assembly is in said second end position.

3. A solenoid valve as claimed in claim 2, wherein the housing has a body of non-magnetic material and a magnetic circuit located in the body and comprising said needle guide, an external tube radially separating the coil from the armature and a ring, the magnetic circuit being closed between the guide and the ring by said armature.

4. A solenoid valve as claimed in claim 3, wherein said armature is carried by the needle, is located opposite the opening and has a flat front surface whose contact with a radial rear surface of said guide determines the second end position.

5. A solenoid valve as claimed in claim 3, wherein the housing comprises a guide tube of non-magnetic material, fixed to said guide and slidably receiving said armature.

6. A solenoid valve as claimed in claim 5, wherein a stop member is force-fitted in a rear portion of the guide tube, the first end position being determined by abutment of said armature against said stop member.

7. A solenoid valve as claimed in claim 1, wherein said means for biasing said needle into continuous engagement with said bearing surface comprises said return spring which is compressed between the housing and a shoulder formed on the needle.

8. A solenoid valve as claimed in claim 7, wherein the shoulder defines an enlarged portion of the needle and said portion is slidably received in a cylindrical blind bore of the armature, the bottom end of said bore forming said bearing surface.

9. A solenoid valve as claimed in claim 1 or 2, wherein a front face of the armature is coated with a thin film of non-magnetic material.

* * * * *